United States Patent [19]
Beukema et al.

[11] Patent Number: 6,128,674
[45] Date of Patent: Oct. 3, 2000

[54] METHOD OF MINIMIZING HOST CPU UTILIZATION IN DRIVING AN ADAPTER BY RESIDING IN SYSTEM MEMORY A COMMAND/STATUS BLOCK A SOFT INTERRUPT BLOCK AND A STATUS BLOCK QUEUE

[75] Inventors: Bruce Leroy Beukema, Hayfield, Minn.; Patrick Allen Buckland, Austin, Tex.; Wen-Tzer Thomas Chen, Austin, Tex.; David Arlen Elko, Austin, Tex.; Ian David Judd, Winchester, United Kingdom; Renato John Recio, Austin, Tex.

[73] Assignee: International Business Machines Corporation, Armonk, N.Y.

[21] Appl. No.: 08/908,888

[22] Filed: Aug. 8, 1997

[51] Int. Cl.[7] .................................................. G06F 13/28
[52] U.S. Cl. .......................... 710/23; 710/24; 710/48
[58] Field of Search ..................................... 395/825, 843, 395/844, 846; 710/5, 23, 24, 26, 39, 260, 263, 48

[56] References Cited

U.S. PATENT DOCUMENTS

| | | | |
|---|---|---|---|
| 4,475,155 | 10/1984 | Oishi et al. ............................... | 364/200 |
| 4,514,808 | 4/1985 | Murayama et al. . | |
| 4,805,137 | 2/1989 | Grant et al. .............................. | 364/900 |
| 4,901,232 | 2/1990 | Harrington et al. ......................... | 710/6 |
| 5,218,678 | 6/1993 | Kelleher et al. ......................... | 395/275 |
| 5,251,303 | 10/1993 | Fogg, Jr. et al. ........................ | 395/275 |
| 5,280,474 | 1/1994 | Nickolls . | |
| 5,434,976 | 7/1995 | Tan et al. ................................. | 395/200 |
| 5,541,914 | 7/1996 | Krishnamoorthy et al. . | |
| 5,598,408 | 1/1997 | Nickolls . | |
| 5,634,099 | 5/1997 | Andrews et al. .................... | 395/200.07 |
| 5,787,305 | 7/1998 | Chen ....................................... | 707/540 |
| 5,805,927 | 9/1998 | Bowes et al. ............................ | 395/843 |
| 5,809,334 | 9/1998 | Galdun et al. ........................... | 395/842 |

*Primary Examiner*—Thomas C. Lee
*Assistant Examiner*—Albert Wang
*Attorney, Agent, or Firm*—Volel Emile; George R. Schultz

[57] ABSTRACT

The system I/O interface and its data structure are designed to minimize the host CPU utilization in driving an adapter. The interface is also designed to reduce the system interference in processing I/O requests. To eliminate the need of using PIO instructions, the command/status blocks for exchanging messages between the system and the adapter reside in the system memory. The data structure is designed to avoid "share write" entries in order to further minimize the overhead of maintaining each coherency when updating an entry in the cache either concurrently or sequentially by both adapter and system CPU. Further, the data structure of the control and status blocks is resided in the system memory. The system CPU uses STORE instruction to prepare control blocks and LOAD instruction to read from completion status blocks; while the adapter will rely on its DMA engine to move data to/from system memory in accessing control/status blocks.

3 Claims, 4 Drawing Sheets

METHOD OF MINIMIZING HOST CPU UTILIZATION IN DRIVING AN ADAPTER BY RESIDING IN SYSTEM MEMORY A COMMAND/STATUS BLOCK A SOFT INTERRUPT BLOCK AND A STATUS BLOCK QUEUE

FIELD OF THE INVENTION

This invention relates to a system input/output interface design for scaling. The interface design optimizes the communication between CPU and its I/O devices. The number of program input/output instructions (PIOs) or memory mapped input/output instructions needed is minimized to reduce CPU idle time. System interference from hardware interrupts is reduced by the "software interrupt" support, as proposed in the system interface design.

BACKGROUND OF THE INVENTION

With today's system input/output (IO) interface design, the central processing unit (CPU) frequently stalls to wait for I/O access to complete. For each I/O operation, the system CPU typically needs to issue 5 to 10 program input/output instructions (PIOs) or memory mapped input/output instructions (MMIOs). As CPU speed becomes much faster than I/O access time, the problem of having to wait for I/O accesses to complete become severe. It is expected that a 1 GHz CPU can stall thousands of instruction cycles when accessing I/O address space. This would result in unacceptable performance, and requires a solution. Therefore, a need exists for a method of efficient communication between CPU and its I/O to reduce the number of PIO, (or MMIOs) required and to reduce the system interference from hardware interrupts.

SUMMARY OF THE INVENTION

The present invention relates to a system I/O interface design, which eliminates the need for most PIOs or MMIOs. To communicate with I/O devices, whether it is an I/O Processor (IOP), a storage adapter, a communication adapter, or the like, the CPU will need to issue only one PIO/MMIO for one (set of) I/O operation(s). By eliminating most of the PIOs, the CPU can communicate efficiently with its peripherals. The CPU idle time can be cut down significantly.

The system I/O interface and its data structure are designed to minimize the host CPU utilization in driving an adapter. The interface is also designed to reduce the system interference in processing I/O requests. To eliminate the need of using PIO instructions, the command/status blocks for exchanging messages between the system and the adapter reside in the system memory. The data structure is designed to avoid "share write" entries in order to further minimize the overhead of maintaining each coherency when updating an entry in the cache either concurrently or sequentially by both adapter and system CPU. Further, the data structure of the control and status blocks is resided in the system memory. The system CPU uses STORE instruction to prepare control blocks and LOAD instruction to read from completion status blocks; while the adapter will rely on its DMA engine to move data to/from system memory in accessing control/status blocks.

BRIEF DESCRIPTION OF THE DRAWINGS

The foreground aspects and other features of the present invention are explained in the following written description, taken in connection with the accompanying drawings, wherein.

DETAILED DESCRIPTION OF THE DRAWINGS

Figure 1:
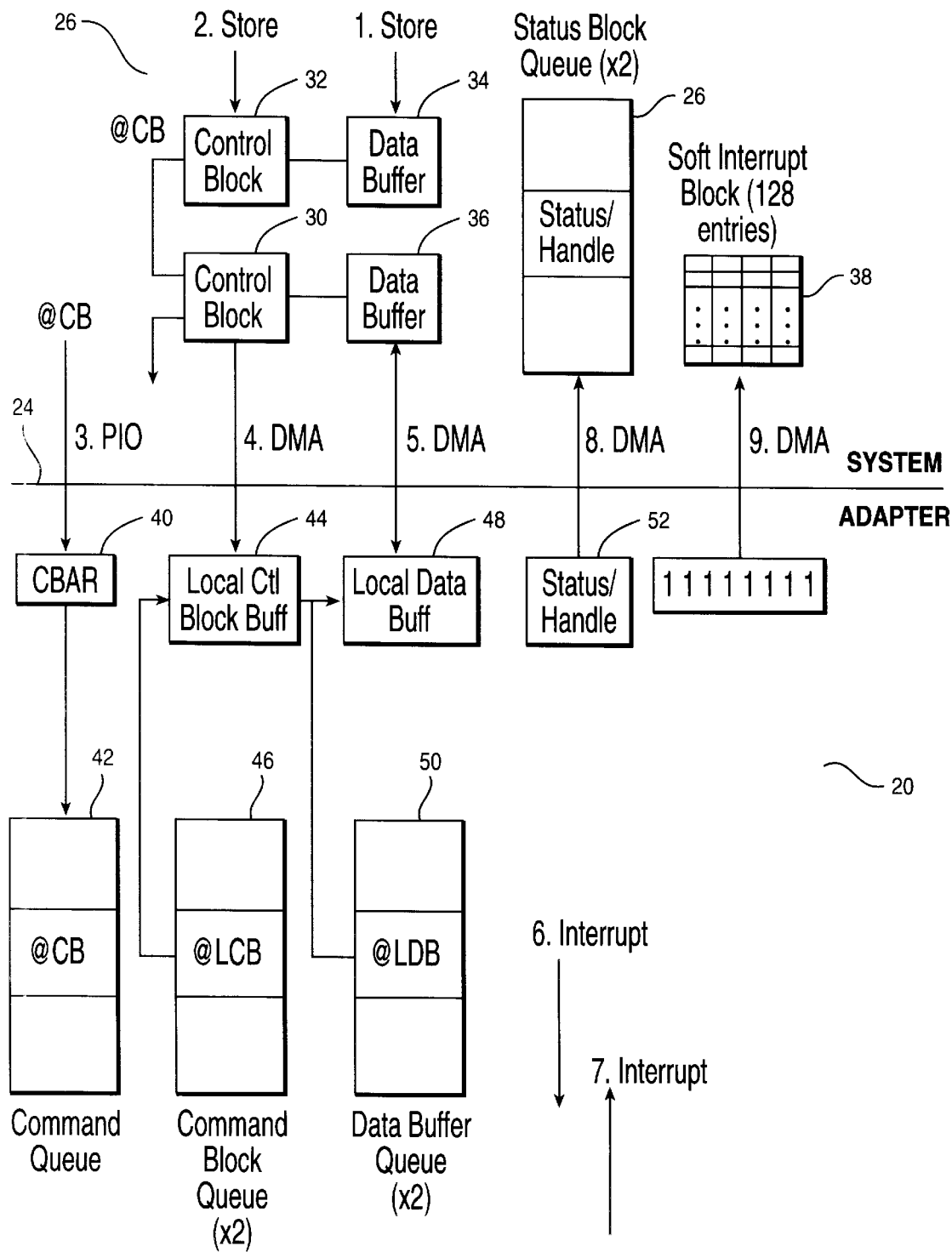
FIG. 1 is a representation of a system input/output interface data structure which embodies the present invention.
Figure 2:
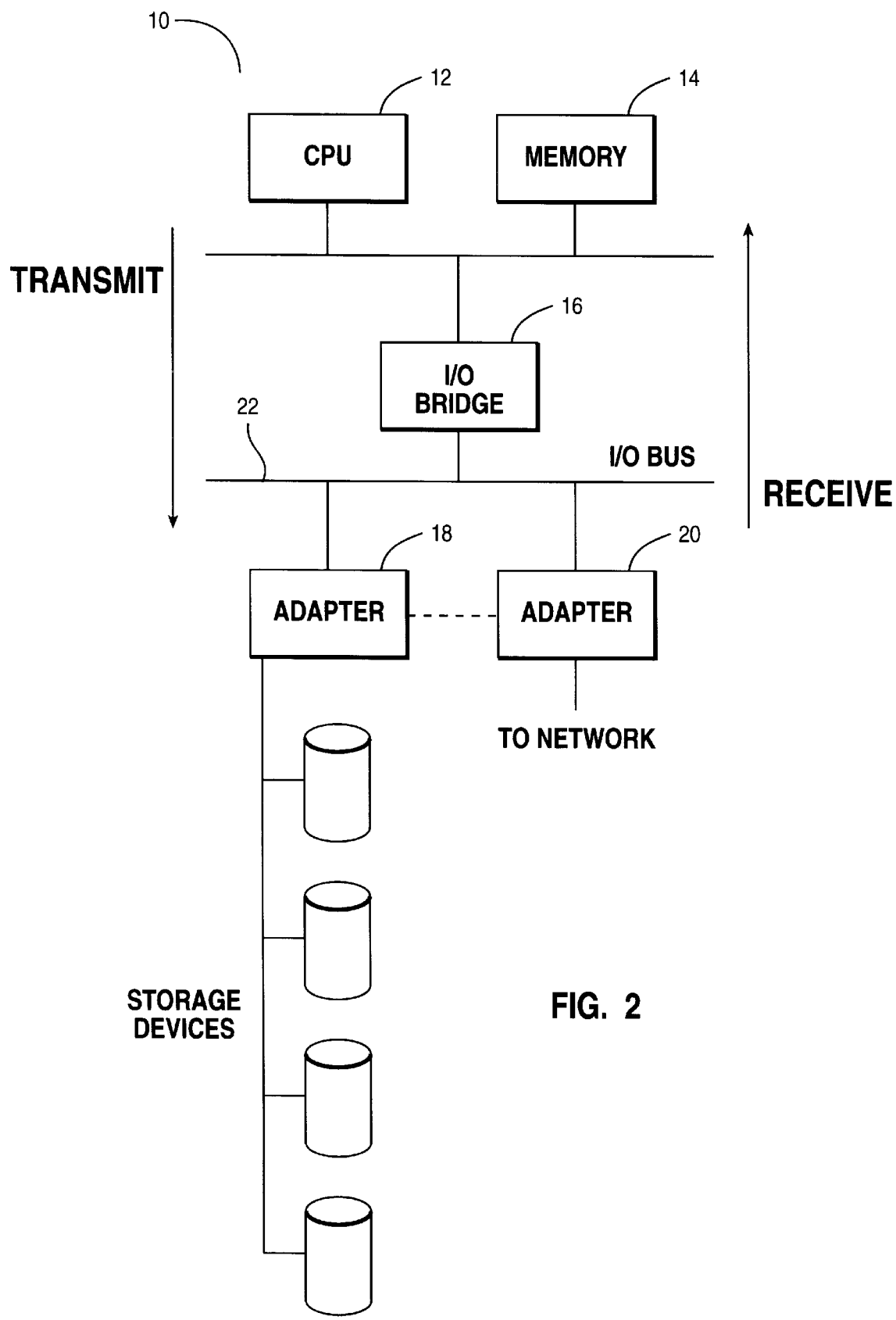
FIG. 2 is a block diagram illustrating a standard computer architecture.

Referring to FIGS. 1 and 2, a computer system 10 used in the present invention is illustrated. The system 10 includes a central processing unit (CPU) 12 and associated memory 14. The CPU 12 interfaces with various adapters 18, 20 connected by an input/output (I/O) bus 22 by means of an input/output bridge 16. As discussed above, the CPU can run many cycles while waiting for I/O address space to be accessed.

The system I/O interface and its data structure 26 is designed to minimize the host CPU utilization in driving the adapter. The term adapter can refer to an IOP, storage adapter, communication adapter, etc. The interface 24 is also designed to reduce the system interference in processing I/O requests. To eliminate the need of using PIO instructions, the command/status blocks for exchanging messages between the system and the adapter reside in the system memory 14. The data structure 26 is designed to avoid "share write" entries in order to further minimize the overhead of maintaining cache coherency when updating an entry in the cache either concurrently or sequentially by both adapter and system CPU. Further, the data structure of the control and status blocks is resided in the system memory 14. The system CPU 12 uses STORE instruction to prepare control blocks and LOAD instruction to read from completion/status blocks; while the adapter will have to rely on its DMA engine to move data to/from system memory in accessing control/status blocks.

A control block 30, 32 consists of a command/control word, data buffer pointer, buffer length, handle, pointer to the next command block, and other command parameters. A command can occupy multiple control blocks 30, 32 if multiple data buffers 34, 36 are required (for scatter/gather). The significant bits in the control/command word are SOP (Start of Packet), EOP (End of Packet), command code, etc. The status block 28 consists of a handle and a status word which indicates the completion status of the request, as identified by the handle. A control block will be prepared by the host processor to pass command information to the adapter. The system CPU 12 will issue a PIO to inform the adapter that a request from the host is ready for processing. The adapter, responding to the command, will acquire the control block, interpret the command, and perform the word requested by the host. Upon completion, the adapter informs the host the completion status via a status block. An interrupt may or may not be generated in passing the completion to the host processor.

The number of interrupts is minimized by taking no system interrupts in transmitting packets and at most one interrupt for receiving a packet. An option of "soft-interrupt" is also proposed to allow the host CPU to do polling efficiently. A 32-word system memory location, the soft-interrupt block 38 supporting 128 devices, is reserved at system initialization for high-speed devices to post soft-interrupts. The interrupts from low-speed devices need not necessarily be optimized since its frequency is relatively low. When an adapter needs attention from the CPU, e.g., after writing to the status block, it writes a byte of 1s (or any agreed to nonzero value) via direct memory access (DMA)

to the corresponding entry in the soft-interrupt block 38. The system will poll the soft-interrupt block every 10 to 20 microsecond, e.g. at clock interrupts. If the corresponding byte of a device is set, its interrupt service routine will be called to process the "soft-interrupt" after the byte is reset to 0s. The soft interrupt overhead is extremely low since the polling can be done in 32 or 16 instructions, depending on whether the processor is 32- or 16-bit, if there is no device interrupt being posted. Note that the 32 words and 128 interrupts is for example only and the actual number will vary with implementation. Using the communication adapter design as an example, the transmit and receive scenarios are described in the following. In this example, the adapter has a processor on the adapter. The interface design can also be implemented on an adapter with no on-board-processor.

Figure 3:
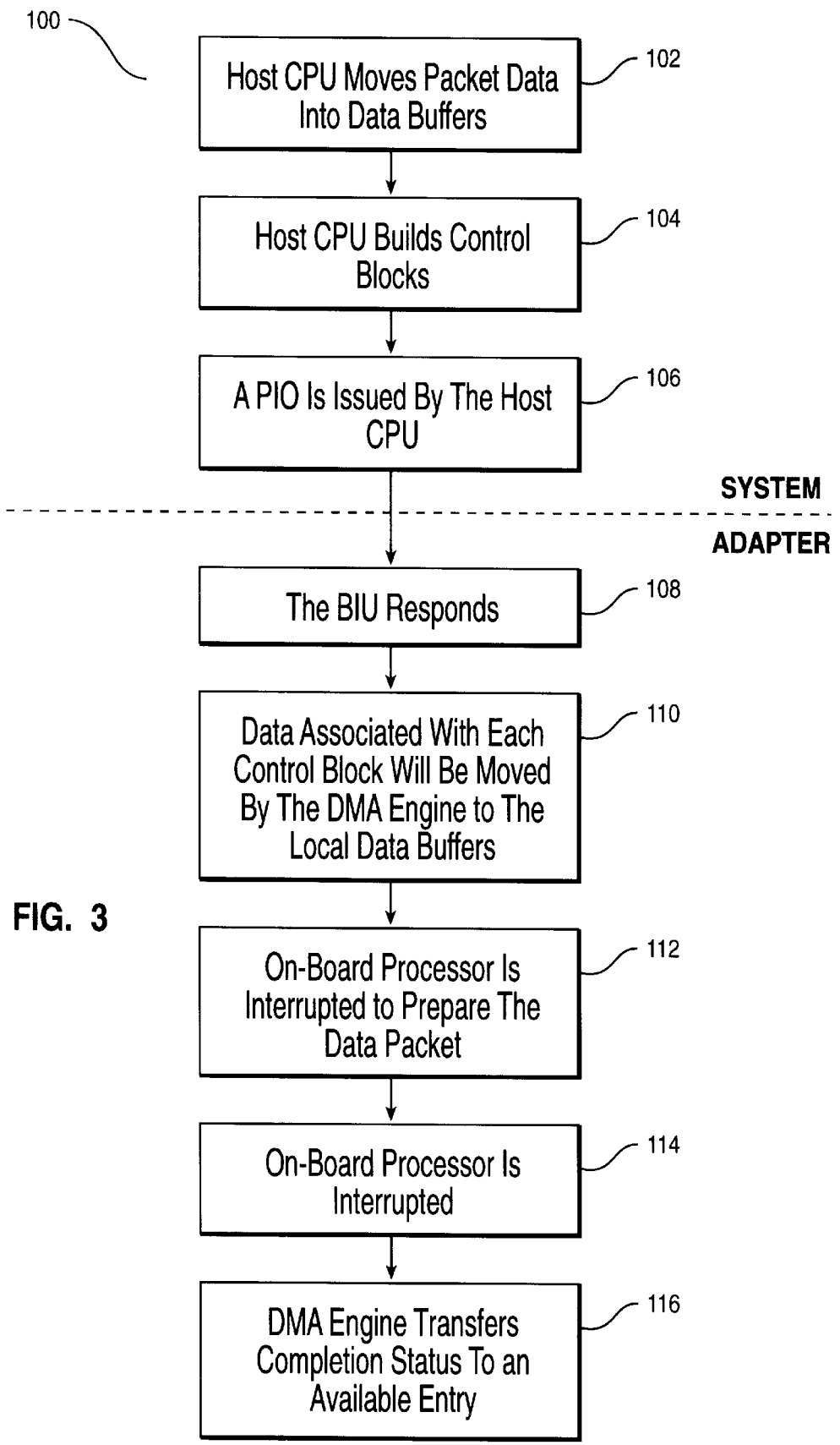
FIG. 3 is flow chart of the transmit scenario.

FIG. 3 illustrates the method of a packet transmission 100. The packet data are resided in the system memory 14. Each packet may occupy multiple data buffers in the system. Generally, the data will be transferred to the adapter memory via DMA. The Media Access Controller (MAC) will transmit data to the network via the physical interface modules when data is ready for transmit in the local memory. The system will be informed when the transmission is complete. Step by step, the host CPU moves packet data 102 into data buffers. Next, the host CPU builds 104 control blocks by setting transmit command, pointer to the data buffer, and other entries. Both SOP and EOP bits, in the only control block, will be set to one if there is only one data buffer associated with this transmit command. The SOP bit in the first control block and the EOP bit in the last control block for this command will be set to one, and the other SOP/EOP bits in the control blocks on the list will be set to 0 if there are multiple data buffers (and control blocks) associated with this command. Next, a PIO is issued 106 by the host CPU to write the address of the first control block to the Control Block Address Register (CBAR) on the adapter. This notifies the adapter that a transmit request is ready for processing. Then, the bus interface unit (BIU) responds 108 and moves the control block address (@CB) from the CBAR to a free command queue entry. DMA is set up to move the control block to a free control block queue entry. If the EOP is not set, the next control block in the list will be moved from the system to the next available CBQ entry. This will continue until the control block with its EOP bit set to one is transferred.

Data associated with each control block will be moved 110 by the DMA engine to the local data buffers one at a time until all data is transferred to the local memory. Next, an on-board processor is interrupted 112 to prepare the data packet for the MAC controller to transfer it to the network. Then, the MAC controller takes over to transmit data to the network. At the end of the network transfer, the on-board processor is interrupted 114 to prepare the completion status for the host. Then, the DMA engine transfers 116 completion status to an available entry in the status queue resided in the system memory address space. The host CPU will process the status to complete the request processing when it enters the device driver again at a later time. Soft interrupt can be issued to inform system CPU of the completion if desired.

Figure 4:
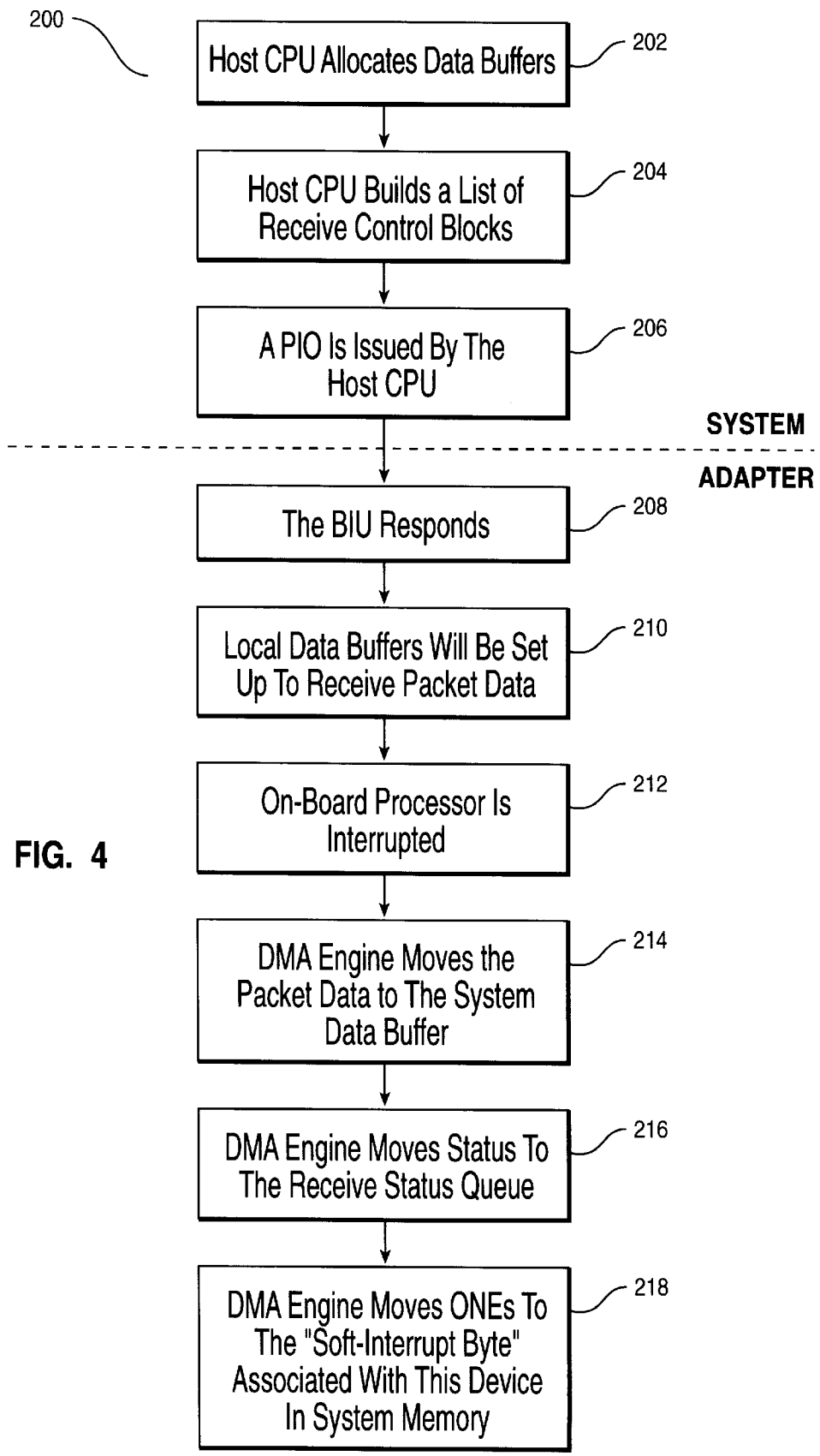
FIG. 4 is a flow chart of the receive scenario.

FIG. 4 illustrates the receive scenario 200. Generally, the system 10 prepares a list of receive control blocks by allocating a free data buffer for each control block and initializing other fields in the control blocks. When the host is ready, it notifies the adapter to start receiving packets from the network by passing the receive control block list to the adapter. When a packet is received from the network, the adapter puts the packet data in the pre-allocated system data buffer and notifies the system that a received packet(s) is ready for processing. Step-by-step, the host CPU allocates 202 data buffers for receiving packets. Next, the host CPU builds 204 a list of receive control blocks. Each control block is associated with a free data buffer. Next, a PIO is issued 206 by the host CPU to inform the adapter that a list of receive control blocks is ready for receiving data packets. The address of the first control block on the list in written to the CBAR register.

The BIU then responds 208 and moves the control block address from the CBAR to a free command queue entry. Direct memory access is set up to move the control block to a free control block queue entry. Every receive control block in the list will be moved one at a time to the local receive control block queue 46. Next, the local data buffers 48 will be set up to receive 210 packet data from the network. Now, the adapter is ready to receive data from the network. On receiving a data packet entirely in the local buffer(s), the on-board processor is interrupted 212 to acquire an available receive control block and to set up DMA engine for moving the packet data to the system data buffer(s). The receive status is also prepared. Next, a DMA engine moves 214 the packet data to the system data buffer associated with the receive control block until all the packet data are transferred. The DMA engine moves 216 status to the receive status queue in the system memory if there is no DMA error. Finally, the DMA engine moves 218 1s to the "soft-interrupt byte" associated with this device in system memory. System will process the received packet(s) when it detects the event at the next polling cycle.

With this proposed system I/O interface design, the CPU need to issue only one PIO of MMIO to initiate a (set of) I/O operation(s). The CPU will not experience long waits for multiple PIOs in initiating I/Os and processing its completion status.

It will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

We claim:

1. A method of minimizing the utilization of a central processing unit (CPU), in a computer system having a system memory, while driving an adapter, said method comprising the step of:

residing a command/status block data structure for exchanging messages between the system and the adapter in the system memory, wherein the CPU uses a store instruction to prepare at least one control block and wherein preparing said control block comprises loading said block with a command control word, a data buffer pointer, and a buffer length;

residing a soft interrupt block for allowing the CPU to poll efficiently in the system memory; and residing a status block queue for indicating the completion status in system memory, wherein the status block queue comprises a handle and a status word.

2. A method of minimizing the utilization of a central processing unit (CPU), in a computer system having a system memory, while driving an adapter, said method comprising the step of:

residing a command/status block data structure for exchanging messages between the system and the adapter in the system memory, wherein the CPU uses a store instruction to prepare at least one control block and wherein preparing said control block comprises loading said block with a command control word, a data buffer pointer, and a buffer length;

residing a soft interrupt block for allowing the CPU to poll efficiently in the system memory, wherein the soft interrupt block is reserved for high-speed device soft interrupts, and residing a status block queue for indicating the completion status in system memory.

3. A method of minimizing the utilization of a central processing unit (CPU), in a computer system having a system memory, while driving an adapter, said method comprising the step of:

residing a command/status block data structure for exchanging messages between the system and the adapter in the system memory, wherein the CPU uses a store instruction to prepare at least one control block and wherein preparing said control block comprises loading said block with a command control word, a data buffer pointer, and a buffer length;

residing a soft interrupt block for allowing the CPU to poll efficiently in the system memory, wherein the soft interrupt block is a 32-word system memory location, and residing a status block queue for indicating the completion status in system memory.

* * * * *